(12) United States Patent
Dentamaro et al.

(10) Patent No.: US 10,592,457 B2
(45) Date of Patent: Mar. 17, 2020

(54) UNIVERSAL TRANSPONDER INTERFACE WITH A DATABUS DOCKING STATION

(71) Applicant: VOXX INTERNATIONAL CORPORATION, Hauppauge, NY (US)

(72) Inventors: Joseph Dentamaro, St. Clair Shores, MI (US); Joseph Santavicca, Macomb, MI (US); Shane Wilson, Clinton Twp., MI (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 352 days.

(21) Appl. No.: 14/509,340

(22) Filed: Oct. 8, 2014

(65) Prior Publication Data

US 2016/0103780 A1    Apr. 14, 2016

(51) Int. Cl.
*G06F 13/36*    (2006.01)
*G06F 13/40*    (2006.01)
*G06F 13/42*    (2006.01)

(52) U.S. Cl.
CPC ...... *G06F 13/4081* (2013.01); *G06F 13/4208* (2013.01)

(58) Field of Classification Search
CPC .......................... G06F 13/4208; G06F 13/4081

USPC ......................................................... 710/308
See application file for complete search history.

(56) References Cited

U.S. PATENT DOCUMENTS

| | | | | |
|---|---|---|---|---|
| 2010/0305779 | A1* | 12/2010 | Hassan | G01C 17/38 701/2 |
| 2011/0191764 | A1* | 8/2011 | Piorecki | G06F 8/65 717/172 |
| 2014/0223531 | A1* | 8/2014 | Outwater | H04L 63/0861 726/7 |
| 2014/0379208 | A1* | 12/2014 | McQuade | G06Q 10/0838 701/33.2 |
| 2015/0269401 | A1* | 9/2015 | Hagedorn Maillard | F02D 29/02 701/102 |

* cited by examiner

*Primary Examiner* — Chun Kuan Lee
(74) *Attorney, Agent, or Firm* — F. Chau & Associates, LLC

(57) ABSTRACT

A universal transponder interface including: a compartment configured to store a vehicle ignition key; a docking station configured to receive a databus cartridge, wherein the databus cartridge includes codes to support a plurality of different types of databus communication; a first interface configured to connect the universal transponder interface to a vehicle databus; and a second interface configured to connect the universal transponder interface to a vehicle security or remote start system.

15 Claims, 3 Drawing Sheets

UNIVERSAL TRANSPONDER INTERFACE WITH A DATABUS DOCKING STATION

TECHNICAL FIELD

The present invention relates to aftermarket vehicle security and remote start systems.

DISCUSSION OF THE RELATED ART

A remote starter is a radio controlled device, which is installed in a vehicle by the factory or an aftermarket installer to preheat or cool the vehicle before the owner gets into it. Once activated, by pushing a button on your keychain remote (or smartphone app), it starts the vehicle automatically for a predetermined time. Different models have keyless entry as well. Most newer vehicles need some kind of bypass module to bypass the factory anti-theft system, so the vehicle can be started without the ignition key in the ignition. This is bypassed only to start the vehicle, which after it is running returns to its original state.

For example, the anti-theft system includes an immobilizer which is an electronic device fitted to the automobile that prevents the engine from running unless the correct key (or other token) is present. However, by storing an extra vehicle ignition key in a bypass module, the engine may be remote started upon transmission of the security code of the key to the immobilizer.

A Controller Area Network (CAN) bus interface or other serial bus control module may connect to a vehicle's databus interface, enabling communication with a security system. For example, the CAN bus interface control module communicates with the vehicle's databus to provide plug-in capability between the module and the security system for various functions. Typical functions include passive anti-theft bypass (transponder, VATS, Passlock, PK3, etc.), factory keyless entry controls, factory arm/disarm, door trigger status, tach signal, dome light supervision, and trunk/hatch open. Compatibility and available functions vary depending upon year, make and model of vehicle.

SUMMARY OF THE INVENTION

According to an exemplary embodiment of the present invention, a universal transponder interface comprises: a compartment configured to store a vehicle ignition key; a docking station configured to receive a databus cartridge, wherein the databus cartridge includes codes to support a plurality of different types of databus communication; a first interface configured to connect the universal transponder interface to a vehicle databus; and a second interface configured to connect the universal transponder interface to a vehicle security or remote start system.

The types of databus communication include a Controller Area Network (CAN), a Society of Automotive Engineers (SAE) J1850, a Single Wire CAN (SWC), a Local Interconnect Network (LIN), or a Low-Speed Fault Tolerant CAN.

The vehicle databus includes a CAN bus, an SAE J1850 bus, an SWC bus, a LIN bus, or a Low-Speed Fault Tolerant CAN bus.

The second interface includes a databus interface (DBI) port.

The universal transponder interface further comprises a databus cartridge, wherein the databus cartridge includes a memory, a microprocessor and an interface.

The interface of the databus cartridge is connected to the first and second interfaces of the universal transponder interface.

Commands provided to a vehicle security/remote start system are routed from the vehicle security/remote start system to the second interface of the universal transponder interface and provided to the vehicle databus via the first interface of the universal transponder interface.

Commands from the vehicle databus are routed to a vehicle security/remote start system via the first interface of the universal transponder interface, the interface of the databus cartridge, and the second interface of universal transponder interface.

The databus cartridge is reprogrammable.

The databus cartridge includes vehicle specific commands.

According to an exemplary embodiment of the present invention, a universal transponder interface comprises: a docking station configured to receive a memory device, wherein the memory device includes codes to support a plurality of different types of databus communication; a first interface configured to connect the universal transponder interface to a vehicle databus; and a second interface configured to connect the universal transponder interface to a vehicle security or remote start system.

The universal transponder interface further comprises a compartment configured to store a vehicle ignition key.

The universal transponder interface further comprises a memory device, wherein the memory device includes codes for remote starting a plurality of different vehicles.

The types of databus communication include CAN, SAE J1850, SWC, LIN, or Low-Speed Fault Tolerant CAN.

The vehicle databus includes a CAN bus, an SAE J1850 bus, an SWC bus, a LIN bus, or a Low-Speed Fault Tolerant CAN bus.

The second interface includes a DBI port.

DETAILED DESCRIPTION OF EXEMPLARY EMBODIMENTS

Figure 1:
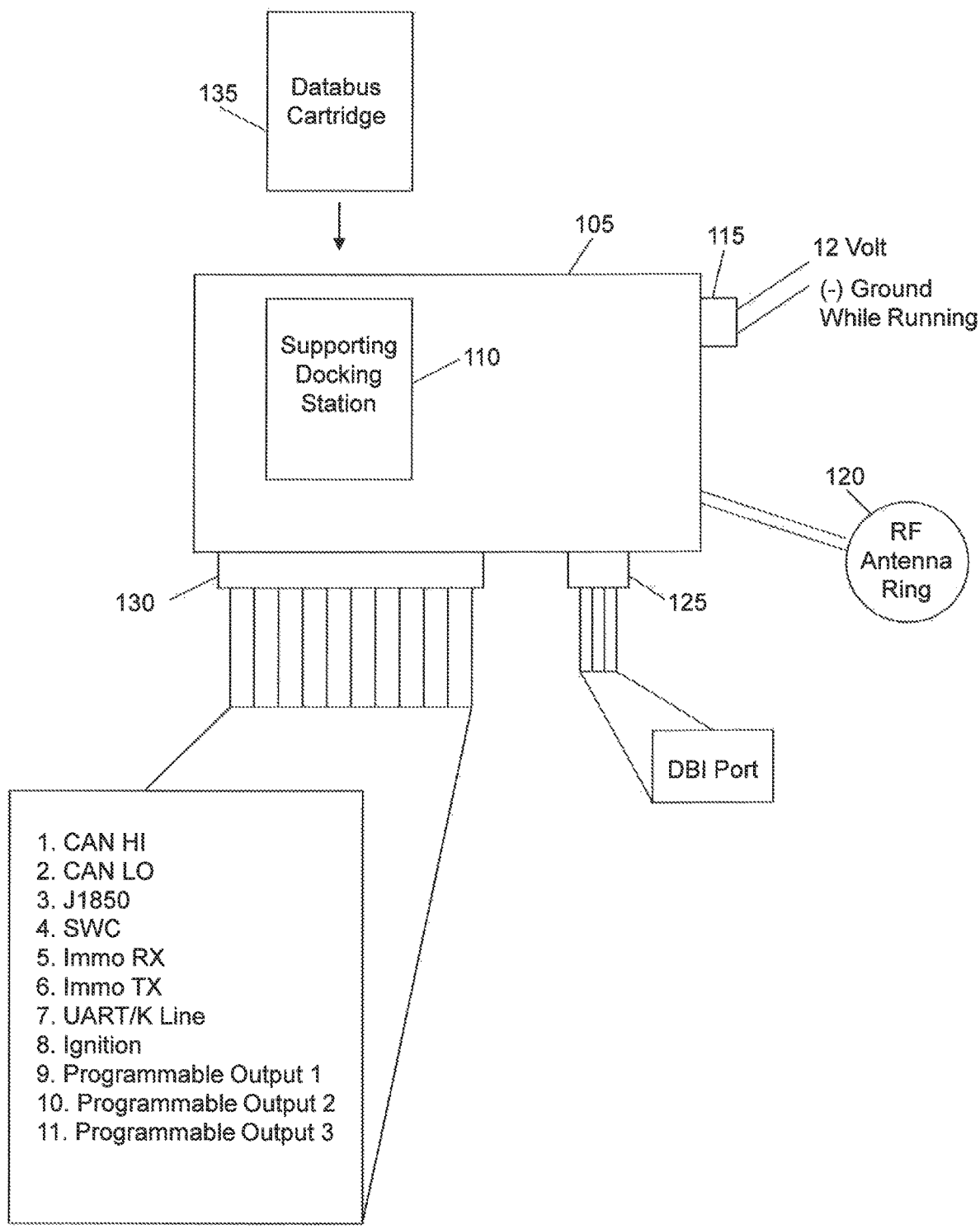
FIG. 1 illustrates a universal transponder interface with a databus docking station according to an exemplary embodiment of the present invention.

FIG. 1 illustrates a universal transponder interface 105 with a databus docking station 110 according to an exemplary embodiment of the present invention.

The universal transponder interface 105 may be in the shape of a small black box or module and configured to store a vehicle ignition key therein. The key may have its own specific code and may include a transponder chip. The universal transponder interface 105 may include a first interface 115 for connecting the universal transponder interface 105 to power (e.g., a 12 Volt line) and ground of a vehicle. These connections may be made via wires. The universal transponder interface 105 may also include a radio frequency (RF) antenna ring 120. The RF antenna ring 120 is used to transmit the transponder code of the ignition key to a vehicle's immobilizer system enabling the vehicle to be remote started. The RF antenna ring 120 may be wired to the universal transponder interface 105. In the event a key is not stored in the universal transponder interface 105, a databus cartridge 135 (to be discussed below) can effectuate remote starting of the vehicle.

The universal transponder interface 105 may include a second interface 125. The second interface 125 may be a databus interface (DBI) port. The DBI port is a quasi-standard communication port used in the aftermarket security/remote start industry. The DBI port may transfer a shared set of Universal Asynchronous Receiver/Transmitter (UART) commands that link various modules needed to meet all the functions and features in the aftermarket security/remote start industry. Data commands include items such as lock, unlock and start commands, vehicle status such as door ajar, ignition on/off, as well as system component status such as armed, disarmed, triggered, remote start active/deactivated, etc.

Components that have DBI port compatibility may include remote start modules, immobilizer transponder bypass modules, security modules, telematics control modules, vehicle databus interface modules, and the like.

The universal transponder interface 105 may include a third interface 130. The third interface 130 may be used to connect the universal transponder interface 105 to a vehicle's databus. The universal transponder interface 105 may connect to all types of automotive databus networks via the third interface 130. For example, the third interface 130 may be physically connectable to a Controller Area Network (CAN) bus, a Society of Automotive Engineers (SAE) J1850 bus, a Single Wire CAN (SWC) bus, a Local Interconnect Network (LIN) bus, a Low-Speed Fault Tolerant CAN bus, etc.

In FIG. 1, the third interface 130 includes terminals for connection to a CAN HI line 1, a CAN LO line 2, a J1580 line 3, an SWC line 4, an immobilizer receiver line 5, an immobilizer transmitter line 6, a UART/K line 7, an ignition line 8 and several programmable output lines 9-11. It is to be understood that the third interface 130 is not limited to the number of terminals shown nor is it limited to the lines connected thereto.

The docking station 110 may be located anywhere on the universal transponder interface 105. For example, it may be located on top of the universal transponder interface 105 or on the side of universal transponder interface 105. The docking station 110 is configured to receive the databus cartridge 135. The databus cartridge 135 includes codes to support various types of databus communication (e.g., physical and transport layer) via CAN J1850, SWC, LIN, Low-Speed Fault Tolerant CAN, etc. The databus cartridge 135 enables the universal transponder interface 105 to communicate with the vehicle's databus when certain specific or additional features are required. The data cartridge 135 contains or can be programmed to contain vehicle specific commands.

Figure 2:
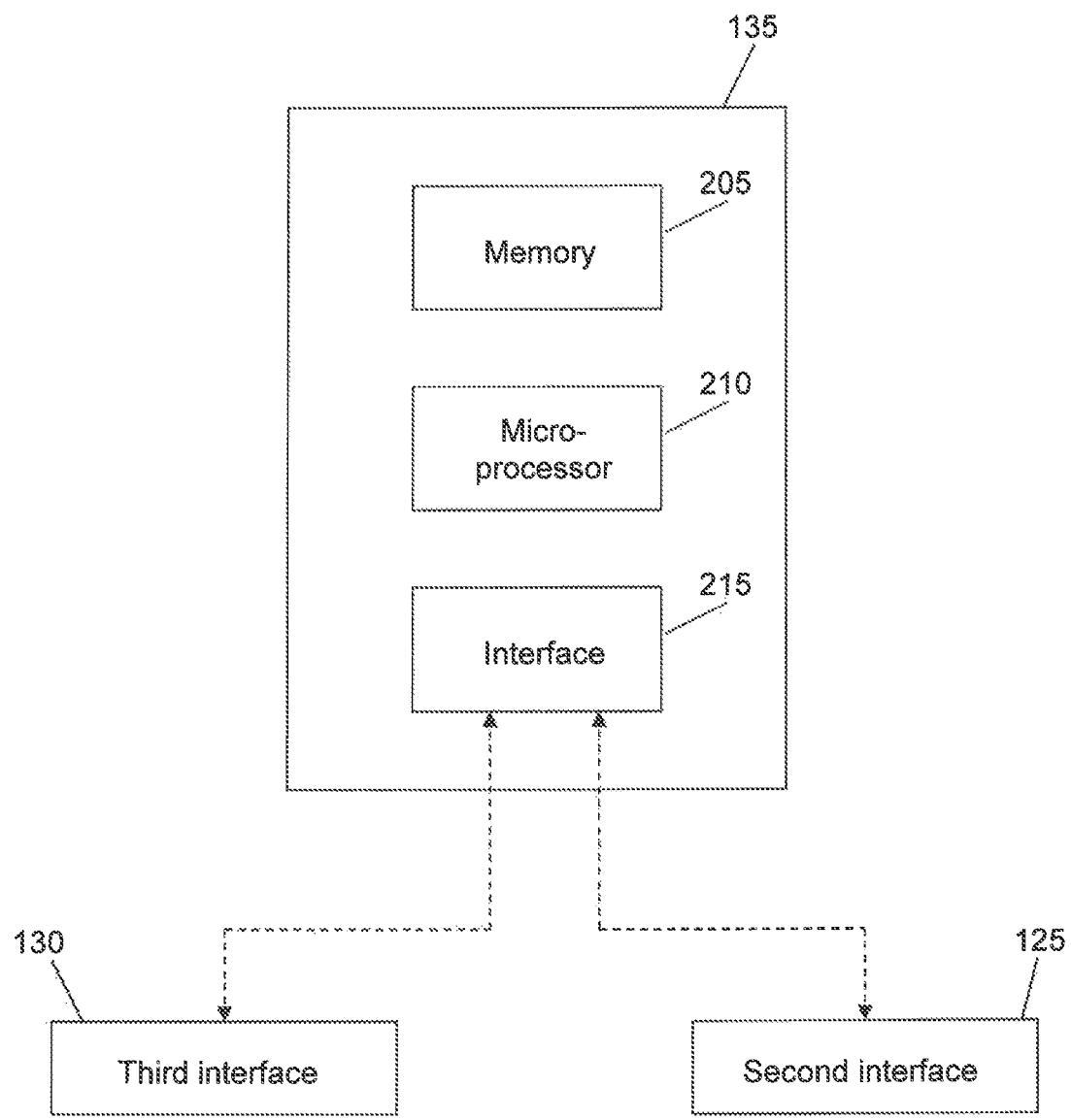
FIG. 2 illustrates a databus cartridge according to an exemplary embodiment of the present invention.

FIG. 2 illustrates the databus cartridge 135 of FIG. 1 according to an exemplary embodiment of the present invention.

The databus cartridge 135 includes a memory 205, a microprocessor 210 and an interface 215 (or interface I/O). The memory 205 may be a nonvolatile memory that stores codes to support various types of databus communication (e.g., physical and transport layer) via CAN, J1850, SWC, LIN, Low-Speed Fault Tolerant CAN, etc. As an example, the codes may be vehicle specific and can be transmitted in one or more of the aforementioned formats. The memory 205 may be writable so that new codes or updates to the codes can be made. The memory 205 may further include micro-instruction code to carry out the various processes and functions described herein. The microprocessor 210 controls the overall operation of the databus cartridge 135 and can process information received via the second and third interfaces 125 and 130. In addition, the microprocessor 210 can utilize the codes stored in the memory 205 so that the databus cartridge 135 can communicate with various databases. For example, by using codes associated with a particular databus in a certain vehicle, the databus cartridge 135 can communicate with that particular databus. By using codes associated with another databus in another vehicle, the datahus cartridge 135 can communicate with the another datahus.

The interface 215 can couple the databus cartridge 135 to the docking station 110 in the universal transponder 105. The interface 215 may be a Universal Serial Bus (USB) interface, Secure Digital (SD), or the like, or direct control. Power may be provided to the databus cartridge 135 when the databus cartridge 135 is connected to the docking station 110. As shown in FIG. 2, once coupled to the docking station 105, the databus cartridge 135 can communicate (as indicated by the arrows) via the second and third interfaces 125 and 130.

The databus cartridge 135 may further include codes capable of remote starting the in the absence of the ignition key. In this case, the remote start codes can be communicated from the interface 215 through the second interface 125 to the remote start/vehicle security module 315.

It is to be understood that the databus cartridge 135 does not have to be an actual cartridge; but instead, can be a memory device such as a nonvolatile memory device. The nonvolatile memory device may include read only memory types, flash memory, phase change memory, magnetoresistive random access memory, ferroelectric random access memory, for example.

Figure 3:
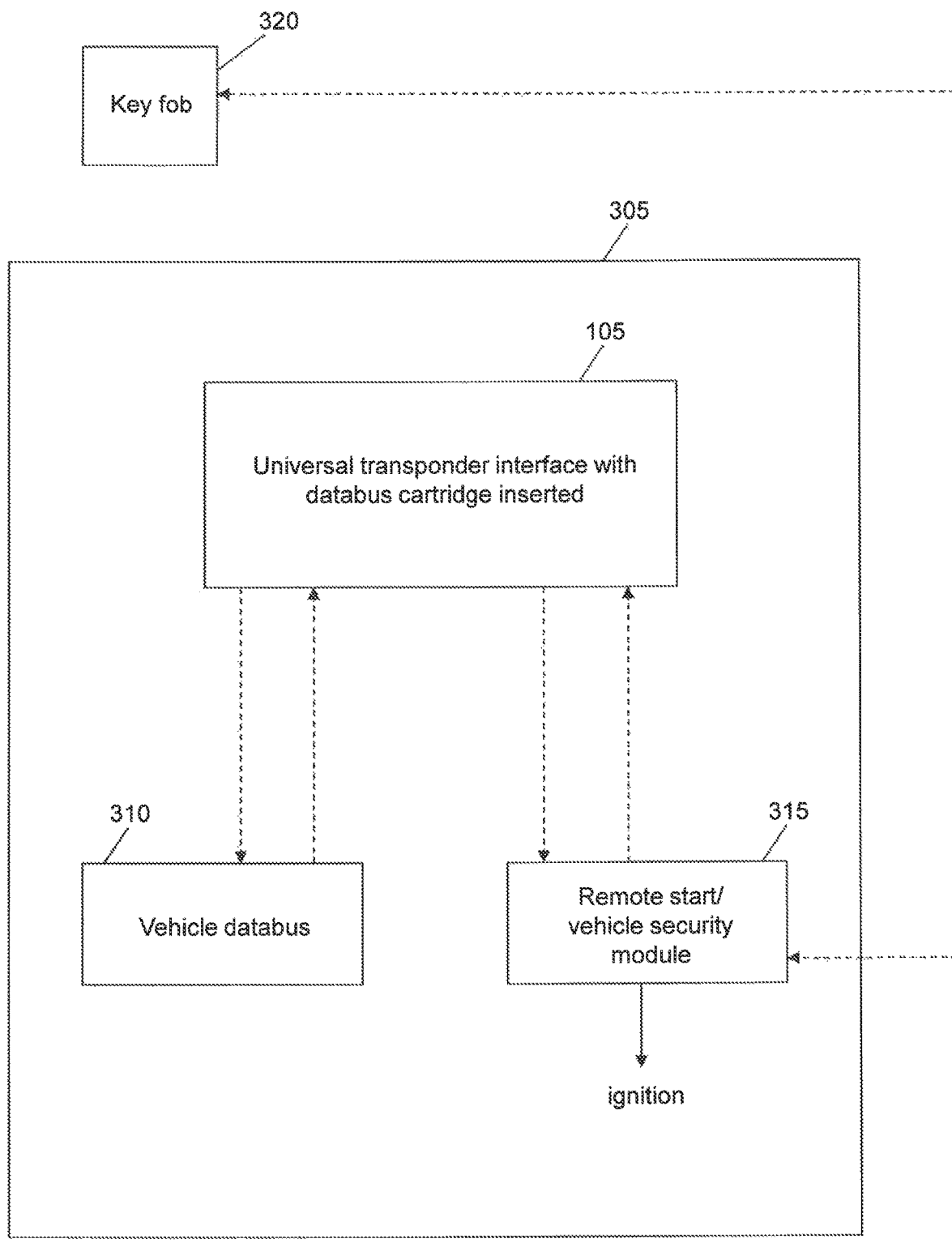
FIG. 3 illustrates an example of the universal transponder interface with a databus docking station installed in a vehicle.

FIG. 3 illustrates an example of the universal transponder interface 105 installed in a vehicle 305.

In an exemplary implementation of the present invention, a user with key fob 320 may send a convenience message to the vehicle 305 such as door unlock. The door unlock message may be received at a remote start/vehicle security module 315. The remote start/vehicle security module 315 may route the message to the universal transponder interface 105 via the DBI port 125 of the universal transponder interface 105. The universal transponder interface 105 (by using the databus cartridge inserted therein) may send the message to the appropriate vehicle hardware over vehicle databus 310. It is to be understood that because the databus cartridge includes codes for communicating over various types of vehicle databuses, the universal transponder interface 105 with the databus cartridge inserted therein may function as a universal gateway for all automotive databus networks.

In another exemplary implementation of the present invention, the user with the key fob 320 may remote start the vehicle 305. In this case, the key fob 320 may transmit a remote start message to the remote start/vehicle security module 315. The universal transponder interface 105 may transmit an indication to the remote start/vehicle security module 315 that the key fob 320 is present in the vehicle 305 (even though it is not) to bypass the immobilizer function of the vehicle 305. The remote start/vehicle security module 315 may then effectuate remote starting of the vehicle 305. In this case, the remote start/vehicle security module 315 may send a start signal directly to ignition input. Also, in this case, a copy of the ignition key may be in the universal transponder interface 105 or codes operable to start the vehicle in the absence of the ignition key copy may be stored in the databus cartridge 135.

In another exemplary embodiment of the present invention, vehicle diagnostic information may be provided through the vehicle's databus to the databus cartridge 135. This information may then be routed from the databus cartridge 135 to the remote start/vehicle security module 315 and/or the key fob 320.

As can be seen, the base device of the present invention can be used as (1) a stand-alone universal transponder interface or "key-in-the-box" in its basic form. This can be used as a low cost dealer solution when only transponder override is needed for a vehicle. Further, by adding the cartridge to the base device, the resulting device can be used for (2) a transponder interface via data messages (instead of using the actual key) and to get convenience functions via the vehicle databus such as door lock, door unlock, door trigger wires, etc. As can be gleaned, the present invention can also employ a combination of 1 and 2 above. For example, in cases where you would need a key for a transponder interface, but also the convenience functions as outlined in 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A universal transponder interface, comprising:
a housing forming a compartment configured to enclose an entire physical vehicle ignition key therein, the key including a transponder chip, wherein the housing includes:
a docking station located at a first external portion of the housing such that a databus cartridge can be removed from and/or added to the housing after the housing is installed in a vehicle, wherein the databus cartridge includes codes to support a plurality of different types of databus communication;
a first interface disposed at a second external portion of the housing and configured to connect the housing to a vehicle databus; and
a second interface disposed at a third external portion of the housing and configured to connect the housing to a vehicle security/remote start system, wherein the housing is hand-held and removable from the vehicle,
wherein the universal transponder interface further includes a radio frequency (RF) antenna ring to transmit a transponder code of the key to the vehicle's ignition system to remote start the vehicle and, when the key is not in the compartment and the databus cartridge is in the docking station, the databus cartridge is used to remote start the vehicle.

2. The universal transponder interface of claim 1, wherein the types of databus communication include a Controller Area Network (CAN), a Society of Automotive Engineers (SAE) J1850, a Single Wire CAN (SWC), a Local Interconnect Network (LIN), or a Low-Speed Fault Tolerant CAN.

3. The universal transponder interface of claim 1, wherein the vehicle databus includes a Controller Area Network (CAN) bus, a Society of Automotive Engineers (SAE) J1850 bus, a Single Wire CAN (SWC) bus, a Local Interconnect Network (LIN) bus, or a Low-Speed Fault Tolerant CAN bus.

4. The universal transponder interface of claim 1, wherein the second interface includes a databus interface (DBI) port.

5. The universal transponder interface of claim 1, wherein the databus cartridge includes a memory, a microprocessor and an interface.

6. The universal transponder interface of claim 5, wherein the interface of the databus cartridge is connected to the first and second interfaces of the universal transponder interface.

7. The universal transponder interface of claim 6, wherein commands provided to a vehicle security/remote start system are routed from the vehicle security/remote start system to the second interface of the universal transponder interface and provided to the vehicle databus via the first interface of the universal transponder interface.

8. The universal transponder interface of claim 6, wherein commands from the vehicle databus are routed to a vehicle security/remote start system via the first interface of the universal transponder interface, the interface of the databus cartridge, and the second interface of universal transponder interface.

9. The universal transponder interface of claim 1, wherein the databus cartridge is reprogrammable.

10. The universal transponder interface of claim 1, wherein the databus cartridge includes vehicle specific commands.

11. A transponder interface, comprising:
a docking station disposed at a first portion of a housing such that a memory device can be removed from and/or added to the housing after the housing is installed in a vehicle, wherein the memory device includes codes to support a plurality of different types of databus communication;
a first interface accessible via a second portion of the housing and configured to connect the housing to a vehicle databus;
a second interface accessible via a third portion of the housing and configured to connect the housing to a vehicle security/remote start system; and
a radio frequency antenna configured to transmit a transponder code of an actual ignition key to a vehicle's immobilizer system enabling the vehicle to be remote started and, when the key is not in the housing and the memory device is in the docking station, the memory device is used to remote start the vehicle,
wherein the housing is hand-held and removable from the vehicle.

12. The transponder interface of claim 11, wherein the memory device includes codes for remote starting a plurality of different vehicles.

13. The transponder interface of claim 11, wherein the types of databus communication include a Controller Area Network (CAN), a Society of Automotive Engineers (SAE) J1850, a Single Wire CAN (SWC), a Local Interconnect Network (LIN), or a Low-Speed Fault Tolerant CAN.

14. The transponder interface of claim 11, wherein the vehicle databus includes a Controller Area Network (CAN) bus, a Society of Automotive Engineers (SAE) J1850 bus, a Single Wire CAN (SWC) bus, a Local Interconnect Network (LIN) bus, or a Low-Speed Fault Tolerant CAN bus.

15. The transponder interface of claim 11, wherein the second interface includes a databus interface (DBI) port.

\* \* \* \* \*